Sept. 9, 1969  A. J. KRINKE  3,465,505
LAWNMOWER

Filed March 18, 1968  2 Sheets-Sheet 1

INVENTOR.
ALVERN J. KRINKE
BY Burd, MacEachron, Braddock,
Bartz & Schwartz
ATTORNEYS Sept. 9, 1969         A. J. KRINKE         3,465,505
LAWNMOWER Filed March 18, 1968                2 Sheets-Sheet 2

INVENTOR.
ALVERN J. KRINKE
BY
Burd, MacEachron, Braddock,
Bartz & Schwartz
ATTORNEYS United States Patent Office 3,465,505
Patented Sept. 9, 1969

3,465,505
LAWNMOWER
Alvern J. Krinke, 4806 Twin Lake Ave. N.,
Brooklyn Center, Minn. 55429
Filed Mar. 18, 1968, Ser. No. 713,853
Int. Cl. A01d 35/26, 75/28, 35/28
U.S. Cl. 56—25.4      8 Claims

ABSTRACT OF THE DISCLOSURE

A mower having wheels pivotally connected to the blade housing so that the housing may assume various angles with respect to the wheels. The mower handle is connected to the wheels so that the wheels will remain vertical when the handle is held vertical. Lock means are provided to hold the handle in a desired position. The pivot point between the housing and the wheels is at a plane below the plane of the wheel axles, to minimize unleveling of the motor.

BACKGROUND OF THE INVENTION

Mowers are generally well known in the art. One problem found with prior art mowers is the disadvantage involved in cutting an embankment or hill in a lateral path, wherein the mower tends to slip down the hill because the wheels assume an angle normal to the hill. The apparatus of this invention overcomes this disadvantage by allowing the wheels to be maintained vertical while the housing is maintained substantially level to the surface being cut. The vertically held wheels will not tend as greatly to slip down the hill as would wheels normal to the hill.

SUMMARY OF THE INVENTION

Briefly described, this invention comprises two pair of wheels, each pair comprising a front and a rear wheel, placed on opposite sides of a mower housing. Each wheel has an axle mounted to a plate, which plate extends downwardly from the axle. A tie-rod interconnects each pair of wheels by being rigidly connected to the lower portion of the respective plate. Each of the tie-rods is pivotally connected to the motor housing, so that the housing can tilt with respect to the wheel. The plane of the pivotal connection is below the plane of the wheel axle, so there will be minimum unleveling of the mower housing when the tilting occurs. In addition, the upper portion of the plates of the two rear wheels are connected by further tie-rods to laterally pivoting handle means connected to the rear of the motor housing. This provides a means for the operator to determine the tilt of the housing with respect to the wheels by moving the handle. Also provided is lock means for locking the handle in a predetermined angle.

IN THE DRAWINGS

DESCRIPTIONS OF THE PREFERRED EMBODIMENTS

Figure 1:
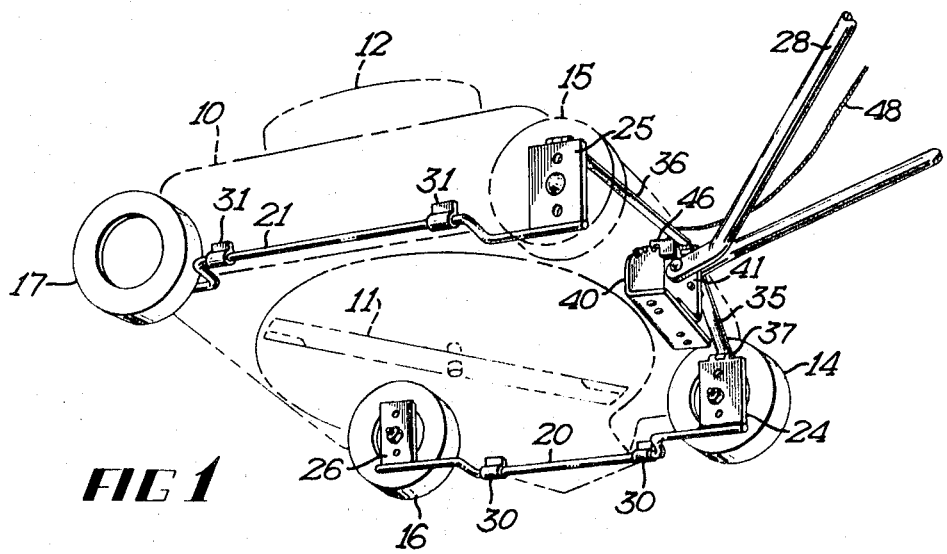
FIGURE 1 is a perspective view of the under portion of a mower utilizing the apparatus of this invention, with the mower housing shown in broken lines.
Figure 2:
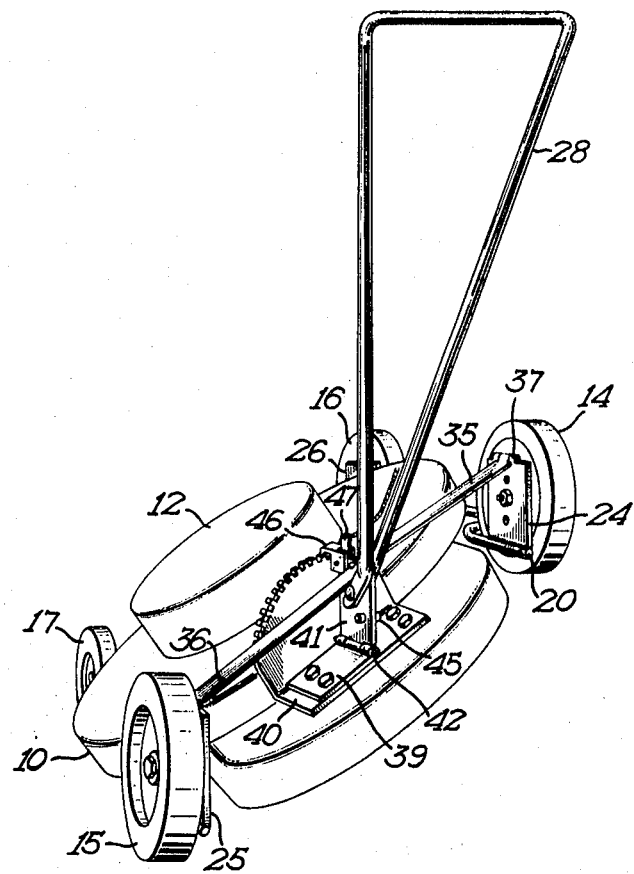
FIGURE 2 is a perspective view of the upper portion, as viewed from the rear, of the mower of FIGURE 1.

Referring first to FIGURES 1 and 2, there is shown a mower housing 10 which would normally be made to include a blade such as blade 11, and means for impelling the blade such as a motor 12. Though a power mower is shown in the preferred embodiment, it will be obvious that mowers other than power mowers fall within the scope of this invention.

In FIGURES 1 and 2 there is shown a pair of wheels including a rear wheel 14 and a front wheel 16 the axles of which are mounted, respectively, to a pair of plates 24 and 26. On the opposite side of housing 10 there is shown another pair of wheels including a rear wheel 15 and a front wheel 17, which also have their axles mounted, respectively, to a pair of plates 25 and 27 (not shown). Each of plates 24, 25, 27 and 27 (not shown) extend downwardly from the point at which the axle of the respective wheel is connected. As can be seen by reference to plate 24, for example, each plate has a plurality of holes in which a wheel axle can be mounted, to select the mower height.

Connected between plates 24 and 26 is a rod 20. Rod 20 may be bent or shaped to conform to the configuration of the housing of the mower such as mower housing 10. On the opposite side of housing 10, a rod 21 is connected between plates 25 and 27 (not shown). It is important to note that rods 20 and 21 are connected to the lower ends of the respective plates.

Rod 20 is pivotally connected to housing 10 by a pair of pivot mounts 30. Pivot mounts 30 are in the same plane as the connection point of rod 20 to plates 24 and 26, and are thus in a plane below the plane of the axles of wheels 14 and 16. Similarly, rod 21 is pivotally connected to the opposite side of housing 10 by a pair of pivot mounts 31, which also cause the pivot plane to lie in a plane below that of the axle of wheels 15 and 17. Pivot mounts 30 and 31 may be welded or bolted to housing 10.

A handle 28 is connected to the rear end of housing 10, by means more fully described below. Handle 10 is also connected to plates 24 and 25 of rear wheels 14 and 15 by means including tie-rods 35 and 36, in a manner also more fully described below.

Figure 3:
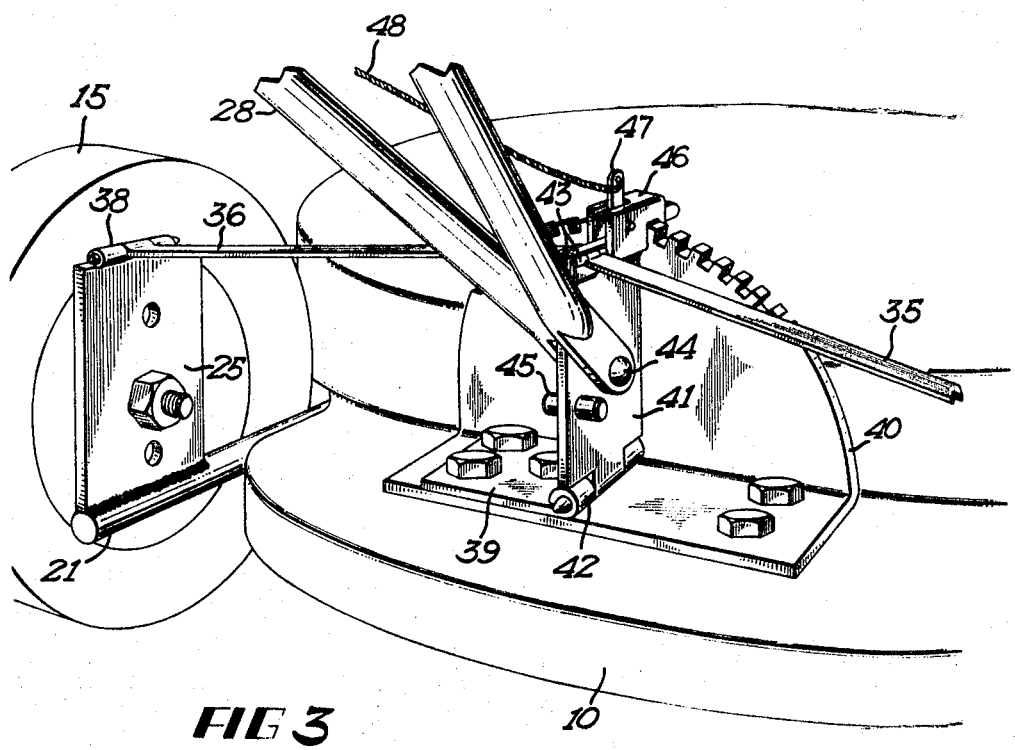
FIGURE 3 is a perspective view of the handle connection portion of the mower of FIGURE 1, including handle locking means.

Referring now to FIGURE 3, there is seen a generally L-shaped member 40 which has one leg mounted on housing 10 and a toothed semi-circular second leg extending upwardly. A plate 39 is also mounted on housing 10 and is connected to hinges 42. A plate 41 is connected to hinges 42 and extends upwardly. Handle 28 is mounted to plate 41 by means of a pivot bolt 44. Handle 28 is thus allowed to pivot in an up and down direction. Also mounted on plate 41 are a pair of stops 45, which limit the downward pivoting of handle 28.

Tie-rods 35 and 36 are connected to plate 41 by hinges 43. It can also be seen that rod 36 is connected by hinges 38 to the upper portion of plate 25, and reference to FIGURE 2 will disclose that rod 35 is connected to the upper portion of plate 24 by hinges 37.

Figures 4, 5:
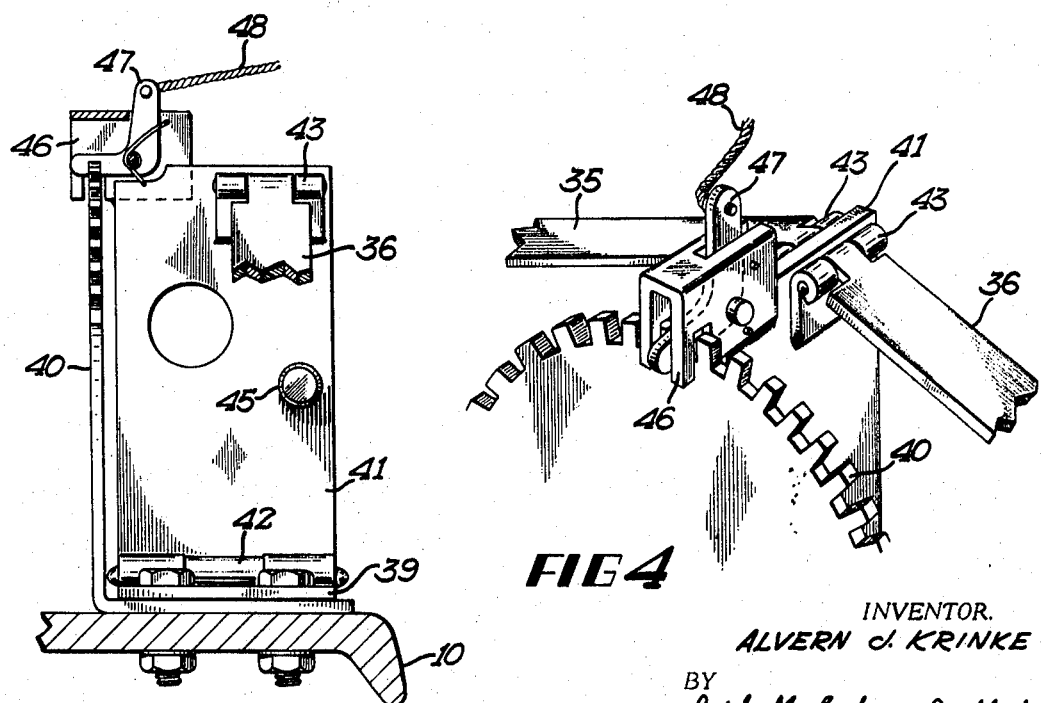
FIGURE 4 is a perspective view of the handle locking means.
FIGURE 5 is a plane view of a portion of the handle locking apparatus.

Referring now to FIGURES 3, 4 and 5, there is disclosed a locking means comprising the upwardly extending toothed leg of member 40, and a tooth engager 46 including a member 47 spring biased toward the teeth of member 40. Engager 46 is mounted on plate 41. Member 47 is connected to a wire which may be connected to handle 28 for ease of actuation of member 47 by a mower operator.

The operation of the apparatus of the invention will be best understood by reference to all of the figures of the drawings. The operator of the mower may grasp the handle, and exert a pulling force on wire 48 to remove member 47 from contact with the teeth of member 40. Then, by the action of hinges 42, 43, 37 and 38, handle 28 will be free to move in a lateral direction to cause wheels 14 and 15 to tilt with respect to housing 10. Because tierods 20 and 21 are rigidly connected to the respective plates on wheels 14 and 16, and wheels 15 and 17, all four wheels will tilt with respect to housing 10. As described above, pivot mounts 30 and 31 will facilitate the tilting of the wheels with respect to the mower.

Thus, if the operator wishes to mow on a slope or embankment with a fairly constant angle of slope, he can tilt the wheels until they are substantially vertical, while allowing the mower to remain generally level with the slope. Handle 28 can be locked in this selected position by releasing wire 48 and allowing member 47 to be spring actuated with the teeth of member 40. If the operator so desires, or if the slope is uneven, the pressure or pull on wire 48 can be kept present so that member 47 will not engage the teeth of member 48, and the operator may hold the handle in the desired position manually, ready for constant change.

It is important to note that the pivot points comprising pivot mounts 30 and 31 are in a plane below the plane of the axles of wheels 14, 15, 16 and 17. This fact allows the wheels to be tilted with respect to housing 10 without significantly decreasing the leveling of the bottom of housing 10 with the slope to be mowed. In a mower actually built and tested, using the apparatus of this invention, the offset from level of the mower housing was found to be $\frac{1}{16}''$ at maximum tilt.

It is preferable also to have, for example, pivot points 31 aligned with the vertical center line of wheels 15 and 17. The same, of course, would be true with respect to pivot points 30 and wheels 14 and 16. This can be accomplished by bending the respective of rods 20 and 21 as needed, and by properly positioning pivot mounts 30 and 31 when they are mounted on housing 10. The result, of this alignment is to further decrease the amount of unleveling caused by tilting the wheels with respect to the lower housing.

When the area to be mowed is level, handle 28 can be locked in position in the manner described above, so that the wheels 14, 15, 16 and 17 will assume the usual right angle with housing 10 and the mower may be operated in the manner of the usual mower. However, the ability to tilt the wheels with respect to the mower housings, when mowing an embankment or hill, enables the operator to keep the wheels vertical without significantly unleveling the bottom of the housing, and thus avoid the tendency of prior art mowers to slide down the hill or embankment. Further, handle 28 can be kept vertical, making operation of the mower simpler.

Though the locking mechanism described above is desirable and adds to the advantage of removing the need for manual "balancing" of the apparatus of this invention, it will be apparent that the locking means forms a portion only of the preferred embodiment, and it would be within the scope of this invention to operate a mower as described above without the described locking mechanism.

The embodiments of the invention in which an exclusive property or privilege is claimed are defined as follows:

1. In mower apparatus including a housing which carries a mower blade and means for impelling the blade, the improvement comprising: a plurality of wheels located about the housing and means pivotally connecting said wheels to the housing for allowing selective change of the angle between said wheels and housing, said pivotal connection between the housing and each wheel being lower than the plane of the axle of each wheel with respect to the mowing surface.

2. The apparatus of claim 1 including:
   said plurality of wheels comprising four wheels placed in pairs of front and rear wheels on opposite sides of the housing;
   a plurality of mounting plates;
   each of said wheels having an axle mounted to one of said plates, the respective plate extending downwardly from the axle;
   a pair of connection rods each rigidly connected to a lower portion of said plates such that each of said rods interconnects one of said pairs of front and rear wheels; and
   means pivotally connecting said pair of rods to said opposite sides of the housing.

3. The apparatus of claim 2 including:
   handle means pivotally connected to a rear portion of the housing and extending generally upwardly and outwardly therefrom, said handle connected to at least pivot laterally.

4. The apparatus of claim 3 including:
   further connection rod means pivotally connected to each of said plates on said rear wheels and to said handle means.

5. The apparatus of claim 4 including lock means for selectively inhibiting lateral pivoting of said handle means.

6. The apparatus of claim 4 in which said lock means comprises:
   tooth means mounted adjacent said handle means;
   tooth engaging means pivotally mounted to said handle means and spring biased toward said tooth means; and
   means for pivoting said tooth engaging means.

7. The apparatus of claim 2 in which:
   said mounting plates include a plurality of apertures in which the axles of said wheels can be mounted, for selecting a desired mowing height.

8. The apparatus of claim 4 in which said handle means includes:
   a further plate hingedly connected to the housing at one end for lateral movement;
   a handle pivotally connected to said further plate for longitudinal movement; and
   pivot means mounted at another end of said plate for connection to said further rod means.

References Cited

UNITED STATES PATENTS

| 2,464,615 | 3/1949 | Sawall | 280—43.23 |
| 2,552,951 | 5/1951 | Freeman | 56—25.4 |
| 2,621,942 | 12/1952 | Getz | 280—43.23 |
| 2,805,867 | 9/1957 | Schramm | 280—43.23 |
| 2,909,884 | 10/1959 | Knarzer | 56—24.5 |
| 2,918,775 | 12/1959 | Hollerith | 56—24.5 |
| 3,001,798 | 9/1961 | Logan | 280—104 |
| 3,083,059 | 3/1963 | Biszantz | 280—6 |

BENJAMIN HERSH, Primary Examiner

R. S. SONG, Assistant Examiner

U.S. Cl. X.R.

56—209; 280—47.23